United States Patent [19]

Sugiyama et al.

[11] Patent Number: 4,739,238

[45] Date of Patent: Apr. 19, 1988

[54] ROTATING MECHANISM CONTROL SYSTEM

[75] Inventors: Yoshio Sugiyama; Yoshiaki Kondo, both of Nagoya, Japan

[73] Assignee: Kabushiki Kaisha Sugiyama Denki Seisakusho, Nagoya, Japan

[21] Appl. No.: 71,179

[22] Filed: Jul. 8, 1987

[30] Foreign Application Priority Data

Jul. 14, 1986 [JP] Japan .................................. 61-165259

[51] Int. Cl.4 ............................................. G05B 13/00
[52] U.S. Cl. ..................................... 318/630; 318/568; 318/638
[58] Field of Search .................... 318/567, 568, 568 H, 318/569, 600, 601, 604, 630, 638; 364/148, 152

[56] References Cited

U.S. PATENT DOCUMENTS 4,251,761 2/1981 Inoue .................................. 318/630
4,325,015 4/1982 Heiberger ...................... 318/630 X

FOREIGN PATENT DOCUMENTS 56-12888 2/1981 Japan ................................... 318/569
0679934 8/1979 U.S.S.R. .............................. 318/630

Primary Examiner—Bentsu Ro
Attorney, Agent, or Firm—Dennison, Meserole, Pollack & Scheiner

[57] ABSTRACT

A system for controlling a rotating mechanism of a robot, press or the like wherein malfunction of the robot, press or the like is prevented by a circuit including a rotational angle detector for detecting the rotational angle when the rotating mechanism is rotated and for generating an output signal representative of the detected angle, and a control circuit which generates a drive control signal for controlling the movement of the robot, press or the like.

1 Claim, 4 Drawing Sheets (A) PRESENT ANGLE (B) PRESENT ROTATIONAL DIRECTION (C) PRECEDING ANGLE (D) PRECEDING ROTATIONAL DIRECTION (E) REFERENCE ANGLE (F) OUTPUT CHANGE INHIBITING FLAG

*FIG. 3*

ROTATING MECHANISM CONTROL SYSTEM

BACKGROUND OF THE INVENTION

1. Field of the Invention

The present invention relates to a system for controlling a rotating mechanism of a robot, press or the like, and more particularly to a system for preventing a false drive signal which may be produced from a drive control circuit by a slight rotation of the input shaft of a rotary encoder for detecting the rotational angle of the rotating mechanism.

2. Description of the Prior Art

In a rotating mechanism of a robot, press or the like, there has been used a system for controlling the rotating mechanism. One known system includes a so-called electronic rotary cam including a rotary encoder or the like and adapted for electronically detecting the rotational angle of the rotating mechanism of the robot, press or the like and for producing an output signal. The output signal produced from the electronic rotary cam is entered in a control circuit which in turn produces a drive control signal for controlling the movement of the robot, press or the like.

Such a conventional rotating mechanism control system, however, has certain drawbacks and disadvantages. For example, when the electronic rotary cam is in process of stopping after rotation or when it is stopped, its angular position may be just on the border of the output signal of the electronic rotary cam, and in such a case, the input shaft of the rotary encoder is slightly rotated through, for example, backlash of the rotating mechanism. Then, the electronic rotary cam produces an output signal which causes the control circuit to produce a false drive control signal. Consequently, the robot, press or the like which is expected to stop receives an operation instruction which will cause troubles such as unintentional movement of a robot arm and abnormal operation of the press, resulting in an accident or production difficulty.

SUMMARY OF THE INVENTION

It is, accordingly, an object of the present invention to provide a system for controlling a robot, press or the like so that the latter may not malfunction even if a rotational angle detector such as an electronic rotary cam is slightly rotated through backlash or the like of the rotating mechanism.

According to the present invention, there is provided a system for controlling a rotating mechanism of a robot, press or the like. The system comprises a rotational angle detector for detecting the rotational angle when the rotating mechanism is rotated and for generating an output signal representative of the detected angle, and a control circuit which generates a drive control signal for controlling the movement of the robot, press or the like. When the rotational angle detector detects the rotational angle of the rotating mechanism and transmits an output signal representative of the detected angle to the control circuit, the control circuit receives the output signal from the rotational angle detector and compares a present rotational angle and a preceding rotational angle every time the rotational angle of the rotating mechanism varies. Then, the control circuit detects whether the rotational direction of the rotating mechanism is inverted, and when the control circuit detects inversion of rotational angle of the rotating mechanism, it calculates the difference between the present rotational angle and the rotational angle immediately before the inversion. If the absolute value of the difference is less than an inoperative angle predetermined according to the mechanical characteristics of the rotating mechanism, the control circuit inhibits changes in output condition of the drive signal for driving the robot, press or the like.

The present invention will become more fully apparent from the claim and the description as it proceeds in connection with the drawings.

BRIEF DESCRIPTION OF THE DRAWINGS

FIG. 3 is a diagram showing work areas of a memory of a microcomputer in the rotating mechanism control system.

DETAILED DESCRIPTION OF A PREFERRED EMBODIMENT

Figure 1:
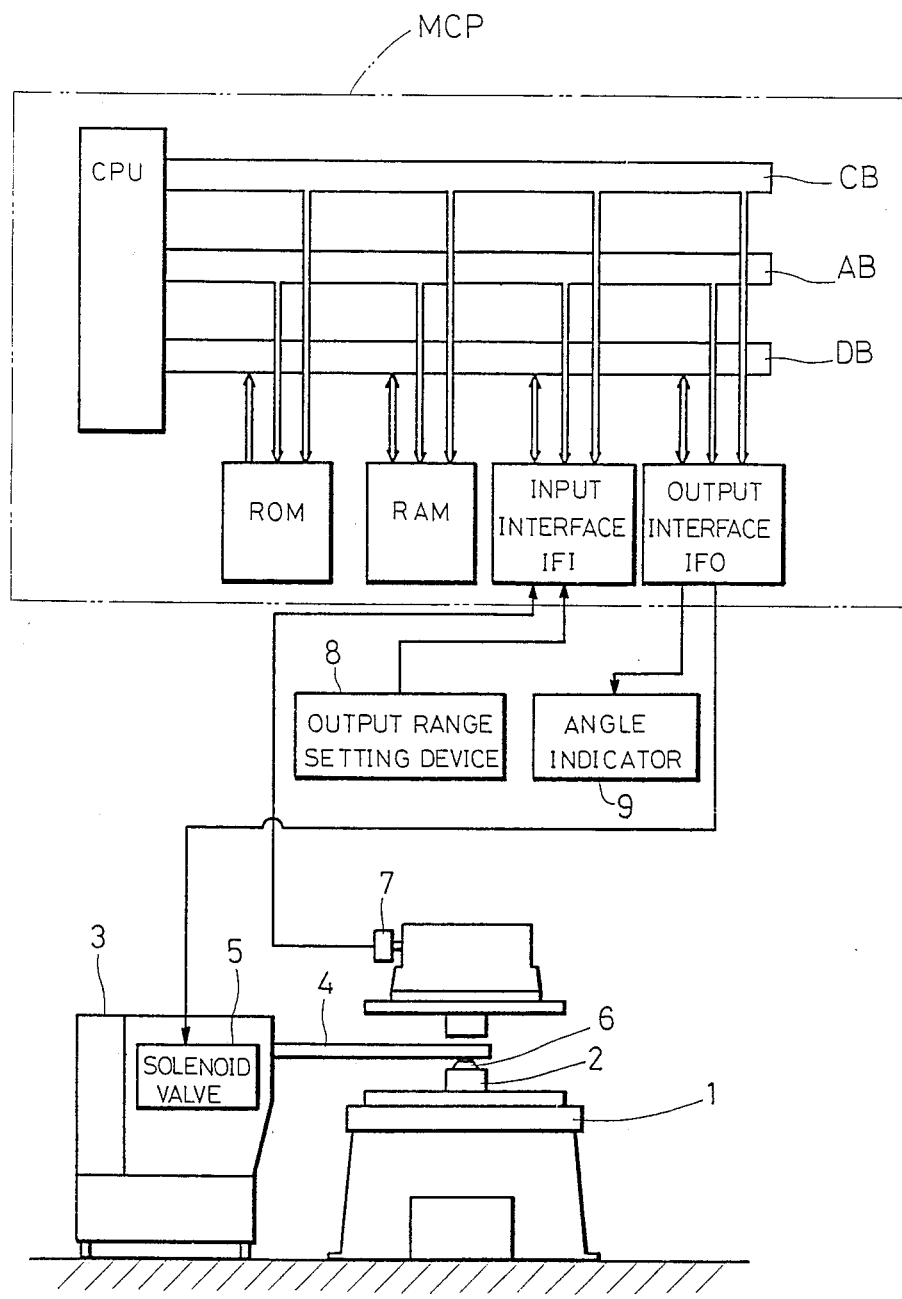
FIG. 1 is block diagram of a rotating mechanism control system constructed in accordance with the present invention.

Referring now to FIG. 1, there is shown a rotating mechanism control system applied to a press 1. A work 2 is conveyed to a predetermined position of the press 1 by a robot 3 having an arm 4, pressed by the press 1, and ultimately carried away by the arm 4 of the robot 3. The arm 4 can be moved horizontally and vertically through a cylinder (not shown) actuated by the opening and closing operation of a solenoid valve 5 mounted on the robot 3. The arm 4 is provided at the free end thereof with a finger 6 for gripping the work 2.

A rotary encoder 7 is attached to a rotating mechanism (not shown) of the press 1 and adapted for detecting the rotational angle corresponding to the cyclic movement of the press 1 and for producing a signal representative of the detected rotational angle. A control circuit is seen to include a microcomputer MCP which in turn includes a microprocessor CPU as a central processing unit. The microprocessor CPU has a control bus CB, an address bus AB and a data bus DB to each of which a read-only memory ROM, a random access memory RAM, an input interface IFI and an output interface IFO are connected. The input interface IFI is connected with the rotary encoder 7 and also with an output range setting device 8 for setting the output range of the drive signal to be sent to the solenoid valve 5 for restricting the travel range of the arm 4 of the robot 3. The output interface IFO is connected with the solenoid valve 5 and also with an angle indicator 9 for indicating the rotational angle of the press 1.

Figure 2A:
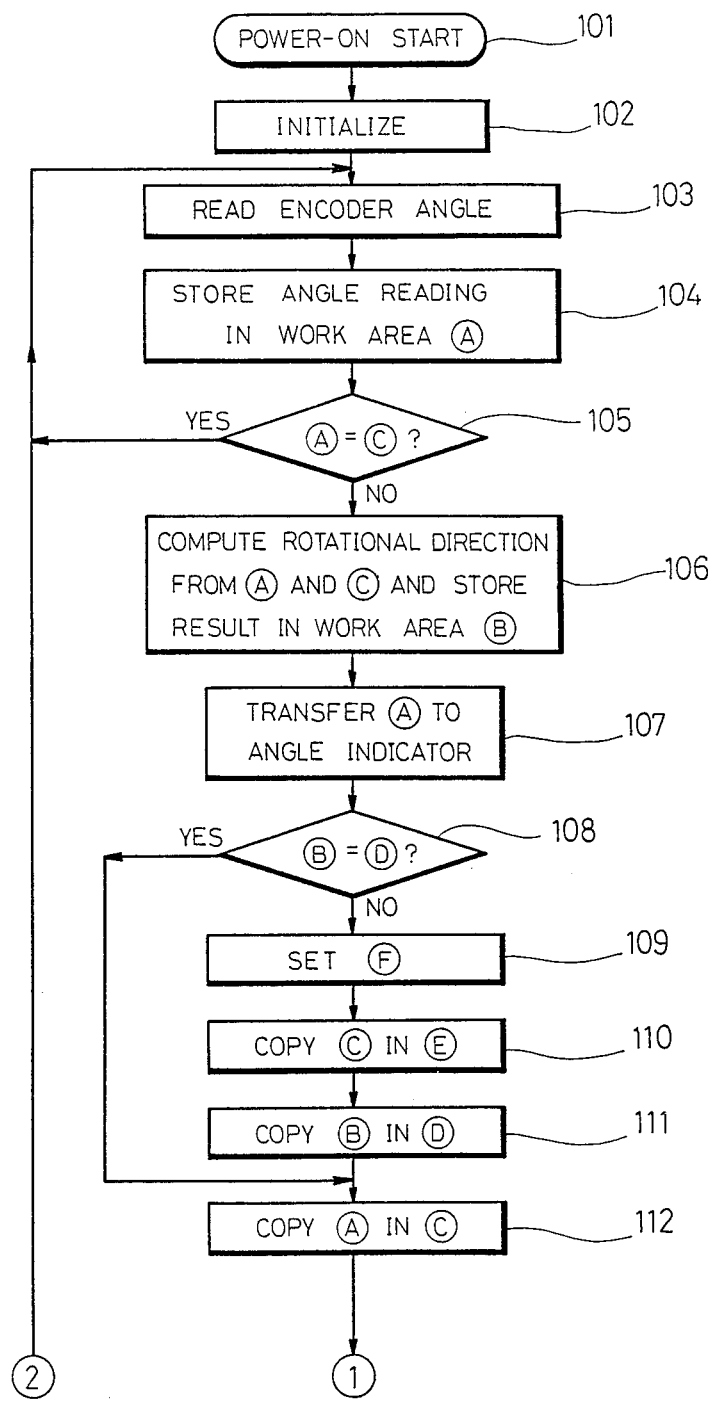
FIGS. 2A and 2B are a control flowchart of the rotating mechanism control system.
Figure 2B:
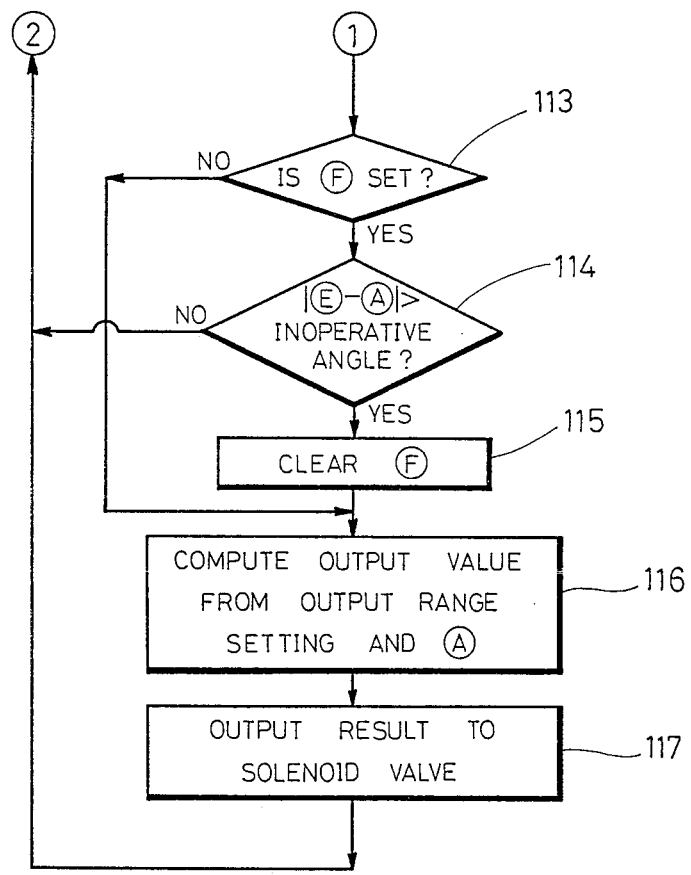

The embodiment described above is operated as shown in FIGS. 2A, 2B and 3. FIGS. 2A and 2B show a control flowchart of the rotating mechanism control system, and FIG. 3 shows work areas of the random access memory RAM which is adapted for temporarily store the data inputted in the microprocessor CPU or for copying and transferring the data.

As shown in FIGS. 2A and 2B, when the power is applied to the press 1, robot 3 and microcomputer MCP (Step 101), the microcomputer MCP is initialized (Step 102). Then, the microcomputer MCP receives an output signal representative of the rotational angle of the rotating mechanism which is produced by the rotary encoder 7 and reads out a present rotational angle (Step 103). In Step 104, the present rotational angle is stored in the work area A in FIG. 3. In Step 105, the present rotational angle stored in the work area A and the preceding rotational angle read and stored in the work area C are compared. If the present rotational angle matches the preceding rotational angle, the microcomputer MCP determines that the rotation of the press 1 is just at the dead point or stopped, and the microcomputer MCP returns to Step 103. On the contrary, if the present rotational angle does not match the preceding rotational angle, the rotational direction of the rotary encoder 7 is calculated from the present rotational angle and the preceding rotational angle (Step 106), and thus obtained rotational direction of the rotary encoder 7 is stored in the work area B for storing the present rotational direction. In Step 107, an indication signal for indicating the present angle reading on the angle indicator 9 is produced.

In Step 108, the present rotational direction of the rotary encoder 7 and the preceding rotational direction are compared. If the microcomputer MCP determines that the two rotational directions match, it proceeds directly to Step 112. On the contrary, if the microcomputer MCP determines that there is no coincidence between the rotational directions, an output change inhibiting flag is set in the work area F for inhibiting changes in output condition of the drive signal to be sent to the solenoid valve 5 (Step 109). In Step 110, the data of the work area C is copied in the work area E to use the preceding angle reading of the rotary encoder 7 stored in the work area C as the present reference angle. In Step 111, the present rotational direction data stored in the work area B is copied in the work area D for storing the preceding rotational direction. Then, in Step 112, the present rotational angle data stored in the work area A is copied in the work area C.

If, in Step 113, the microcomputer MCP determines that the output change inhibiting flag is set in the work area F for inhibiting changes in output condition of the drive signal, (angle of the work area E—angle of the work area A) is calculated, and the microcomputer MCP determines whether or not the absolute value is greater than a predetermined inoperative angle, that is, a minimum angle required to ignore the rotational angle of the rotary encoder 7 caused by backlash or the like of the rotating mechanism of the press 1 (Step 114). If the microcomputer MCP determines that the absolute value is greater than the inoperative angle, then it determines that the rotary encoder 7 produces a signal corresponding to the rotational angle under the normal control, and the output change inhibiting flag which has been set in the work area F is removed (Step 115). On the contrary, if the microcomputer MCP determines that the absolute value is less than the inoperative angle, then it determines that the rotary encoder 7 is rotated through backlash or the like of the rotating mechanism and consequently produces a signal corresponding to the rotational angle, and the output condition of the drive signal to be sent to the solenoid valve 5 is not changed, and the microcomputer MCP returns from Step 114 to Step 103.

When the output change inhibiting flag is removed in Step 115, output value for the solenoid valve 5 is calculated from the value set by the output range setting device 8 and the present angle reading stored in the work area A (Step 116). In Step 117, an output signal corresponding to the calculation result is sent to the solenoid valve 5 to actuate the arm 4 for a desired travel. Then, the microcomputer MCP returns to Step 103 to repeat the same process.

In the control system according to the present invention, even when the rotational angle detector attached to the rotating mechanism of a robot, press or the like is slightly rotated through backlash or the like of the rotating mechanism and consequently produces an output signal, the microcomputer determines that the output signal is generated through backlash or the like. Therefore, the control system is effective to prevent the driving mechanism, which is driven under the signal from the rotational angle detector, from malfunction which will cause an accident or production difficulty.

Especially, as the angular resolution of the rotational angle detector and comparison becomes finer, the backlash becomes more remarkable, and in such a case, the present invention becomes more effective.

While the invention has been described with reference to a preferred embodiment thereof, it is to be understood that modifications or variations may be easily made without departing from the scope of the present invention which is defined by the appended claim.

What is claimed is:

1. A system for controlling a rotating mechanism of a robot, press or the like, comprising:

a rotational angle detector for detecting the rotational angle when the rotating mechanism is rotated and for generating an output signal representative of the detected angle;

first comparing means for receiving the output signal from said rotational angle detector and for comparing a present rotational angle and a preceding rotational angle every time the rotational angle of the rotating mechanism varies and for generating an output signal representative of the comparison result;

inversion detecting means for receiving the signal from said first comparing means and for detecting inversion of rotational direction of said rotating mechanism;

angle difference computing means for computing the difference between the present rotational angle and the rotational angle immediately before the inversion when said inversion detecting means detects the inversion of rotational direction of the rotating mechanism;

second comparing means for comparing the absolute value of the computed angle difference with an inoperative angle predetermined according to the mechanical characteristics of the rotating mechanism; and control means for inhibiting changes in output condition of the drive signal for driving the robot, press or the like if said second comparing means indicates that the absolute value of the angle difference is less than the inoperative angle.

* * * * *